United States Patent
Szuflita et al.

(10) Patent No.: US 11,914,741 B2
(45) Date of Patent: *Feb. 27, 2024

(54) DATA SECURITY

(71) Applicant: Palantir Technologies Inc., Denver, CO (US)

(72) Inventors: Samuel Szuflita, New York, NY (US); Alice Yu, San Francisco, CA (US); Emily Wang, New York, NY (US); Hao Dang, Redmond, WA (US); Megha Arora, Palo Alto, CA (US); Nicholas Gates, London (GB); Samuel Rogerson, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 346 days.

This patent is subject to a terminal disclaimer.

(21) Appl. No.: 17/444,245

(22) Filed: Aug. 2, 2021

(65) Prior Publication Data

US 2021/0365581 A1 Nov. 25, 2021

Related U.S. Application Data

(63) Continuation of application No. 16/219,504, filed on Dec. 13, 2018, now Pat. No. 11,093,634.

(Continued)

(51) Int. Cl.
*G06F 21/62* (2013.01)
*G06F 21/60* (2013.01)
(Continued)

(52) U.S. Cl.
CPC ........ *G06F 21/6227* (2013.01); *G06F 16/367* (2019.01); *G06F 16/9024* (2019.01); *G06F 16/90344* (2019.01); *G06F 21/604* (2013.01); *G06F 21/6245* (2013.01); *G06F 2221/2141* (2013.01)

(58) Field of Classification Search
CPC .............. G06F 21/6227; G06F 16/367; G06F 16/90344; G06F 16/9024; G06F 21/604; G06F 21/6245; G06F 2221/2141
See application file for complete search history.

(56) References Cited

U.S. PATENT DOCUMENTS 11,093,634 B1 8/2021 Szuflita et al.
2009/0178144 A1 7/2009 Redlich et al.
(Continued)

*Primary Examiner* — Truong V Vo
(74) *Attorney, Agent, or Firm* — Knobbe, Martens, Olson & Bear, LLP

(57) ABSTRACT

A computer system is configured to receiving a data set from a data provider and automatically save the data set in a quarantine database where copying, moving, and sharing of the data set are restricted until the data set is released by a data provider. The data set is parsed to find and mark portions with potentially sensitive information. At least those parts are reviewed by a data governor, who can confirm, add, edit, or remove markers. Those parts can be visually indicated to the data governor, along with a preview of, metadata about, and analysis of the data set. After reviewing at least the automatically marked portions, the data governor can release the data set to a non-quarantine database where another user can use the data set. The user is restricted from accessing the quarantine database.

20 Claims, 10 Drawing Sheets

Related U.S. Application Data

(60) Provisional application No. 62/747,532, filed on Oct. 18, 2018.

(51) Int. Cl.
  *G06F 16/901* (2019.01)
  *G06F 16/36* (2019.01)
  *G06F 16/903* (2019.01)

(56) References Cited

U.S. PATENT DOCUMENTS

2010/0088258 A1* 4/2010 Oaten ............... G06N 5/02
  706/50
2014/0047551 A1 2/2014 Nagasundaram et al.

* cited by examiner

DATA SECURITY

REFERENCE TO RELATED APPLICATIONS

This application is a continuation of U.S. patent application Ser. No. 16/219,504, filed Dec. 13, 2018 and titled "DATA SECURITY," which application claims the priority benefit of provisional U.S. Pat. App. No. 62/747,532, filed on Oct. 18, 2018 and titled "DATA SECURITY," the entire disclosures of which are hereby made a part of this application and incorporated by reference for all purposes in their entireties.

TECHNICAL FIELD

The present disclosure relates to data security.

BACKGROUND

Data is sometimes shared between people or groups. The privacy and security of the data can be a concern during the sharing process.

SUMMARY

Some aspects feature a computer-implemented method of securing data for ontological classification, the method comprising: receiving a data set; storing the data set in a quarantine database where copying, moving, and sharing of the data set are restricted until released; parsing the data set to determine a portion of the data set that matches criteria indicative of potentially sensitive data; transmitting data to visually indicate the portion of the data set to a first user; receiving, from the first user, a sensitivity marker applied to at least the portion of the data set or confirmation of the sensitivity marker; receiving, from the first user, an authorization to release one or more portions of the data set from the quarantine database; moving the one or more portions of the data set to a second database where copying, moving, or sharing of the data set are permitted; based at least on an access authorization of a second user and the sensitivity marker, granting the second user access to the data set in the second database, wherein the second user is not authorized to access the data set in the quarantine database; and receiving, from the second user, instructions for applying an ontology to the data set.

The method can include one, all, or any combination of the following features. The first user is not authorized to use or share the data set that is the second database, and the second user is not authorized to view, copy, move, share, or release the data set in the quarantine database. The data set is received from a data provider, and the data provider is not authorized to release the data set from the quarantine database. The data provider is not authorized to write data sets to the second database. The method further includes: receiving a regular expression or a selection of the regular expression, and the regular expression is used as the criteria indicative of potentially sensitive data. The method further includes: determining, based on matching the regular expression to the portion of the data set, an indication of a type of sensitive information; and transmitting data to visually indicate that the portion of the data set is the type of sensitive information. The data set is received from a data provider, and the regular expression is provided or selected by the data provider. The method further includes: transmitting data to display, to the second user, a list of a plurality of data sets in the second database; wherein the list of the plurality of data sets includes the data set; and wherein the list of the plurality of data sets is filtered to exclude any data sets associated with markers that the second user is not authorized to view. The method further includes: performing a statistical analysis on the portion of the data set; and transmitting data to display, to the first user, results of the statistical analysis about the portion of the data set, wherein the statistical analysis is indicative of a uniqueness of the portion of the data set. The statistical analysis includes at least one of: a graph indicating a distribution of values; a histogram; a report about a number of unique entries; or a report about a number of repeated entries.

Some aspects feature a computer system comprising: one or more non-transitory, computer readable storage devices configured to store computer-readable instructions and one or more processors configured to execute the computer-readable instructions to cause the computer system to perform operations. The operations include: receiving a data set; storing the data set in a quarantine database where copying, moving, and sharing of the data set are restricted until released; parsing the data set to determine a portion of the data set that matches criteria indicative of potentially sensitive data; transmitting data to visually indicate the portion of the data set to a first user; receiving, from the first user, a sensitivity marker applied to at least the portion of the data set or confirmation of the sensitivity marker; receiving, from the first user, an authorization to release one or more portions of the data set from the quarantine database; moving the data set to a second database where copying, moving, or sharing of the data set are permitted; based at least on an access authorization of a second user and the sensitivity marker, granting the second user access to the data set in the second database, wherein the second user is not authorized to access data in the quarantine database; and receiving, from the second user, instructions for applying an ontology to the data set.

The system can include one, all, or any combination of the following features. The first user is not authorized to use or share the data set that is the second database, and the second user is not authorized to view, copy, move, share, or release the data set in the quarantine database. The data set is received from a data provider, and the data provider is not authorized to release the data set from the quarantine database. The data provider is not authorized to write data sets to the second database. The operations further include: receiving a regular expression or a selection of the regular expression, and the regular expression is used as the criteria indicative of potentially sensitive data. The operations further include: determining, based on matching the regular expression to the portion of the data set, an indication of a type of sensitive information; and transmitting data to visually indicate that the portion of the data set is the type of sensitive information. The data set is received from a data provider, and the regular expression is provided or selected by the data provider. The operations further include: transmitting data to display, to the second user, a list of a plurality of data sets in the second database; wherein the list of the plurality of data sets includes the data set; and wherein the list of the plurality of data sets is filtered to exclude any data sets associated with markers that the second user is not authorized to view. The operations further include: performing a statistical analysis on the portion of the data set; and transmitting data to display, to the first user, results of the statistical analysis about the portion of the data set, wherein the statistical analysis is indicative of a uniqueness of the portion of the data set. The statistical analysis includes at least one of: a graph indicating a distribution of values; a histogram; a report about a number of unique entries; or a report about a number of repeated entries.

Some aspects feature a computer-implemented method of securing data for ontological classification. The computer-method includes: receiving a data set; storing the data set in a quarantine database; determining that at least a portion of the data set matches criteria indicative of potentially sensitive data; transmitting data to visually indicate the portion of the data set to a first user; applying a sensitivity marker received from the first user to at least the portion of the data set or receiving a confirmation of the sensitivity marker's application to at least the portion of the data set; and based at least on an access authorization of a second user and the sensitivity marker, granting the second user access to the data set.

The computer-implemented method can include one, all, or any combination of the following features. Receiving, from the first user, an authorization to release one or more portions of the data set from the quarantine database; moving the one or more portions of the data set to a second database where copying, moving, or sharing of the data set are permitted; receiving, from the second user, instructions for applying an ontology to the data set; wherein the second user is granted access to the data set that is in the second database; wherein the second user is not authorized to access the data set in the quarantine database; and wherein copying, moving, and share of the data set are prohibited for the data set while the data set is in the quarantine database until the data set is released from the quarantine database. The first user is not authorized to use or share the data set that is in the second database; and the second user is not authorized to view, copy, move, share, or release the data set in the quarantine database. The data set is received from a data provider; and wherein the data provider is not authorized to release the data set from the quarantine database. The data provider is not authorized to write data sets to the second database. Receiving a regular expression or a selection of the regular expression; and wherein the regular expression is used as the criteria indicative of potentially sensitive data. Determining, based on matching the regular expression to the portion of the data set, an indication of a type of sensitive information; and transmitting data to visually indicate that the portion of the data set is the type of sensitive information. The data set is received from a data provider; and the regular expression is provided or selected by the data provider. Transmitting data to display, to the second user, a list of a plurality of data sets in the second database; wherein the list of the plurality of data sets includes the data set; and wherein the list of the plurality of data sets is filtered to exclude any data sets associated with markers that the second user is not authorized to view. Performing a statistical analysis on the portion of the data set; and transmitting data to display, to the first user, results of the statistical analysis about the portion of the data set, wherein the statistical analysis is indicative of a uniqueness of the portion of the data set. The statistical analysis includes at least one of: a graph indicating a distribution of values; a histogram; a report about a number of unique entries; or a report about a number of repeated entries.

Some aspects feature a computer system comprising: one or more non-transitory, computer readable storage devices configured to store computer-readable instructions; and one or more processors configured to execute the computer-readable instructions to cause the computer system to perform operations. The operations include: receiving a data set; storing the data set in a quarantine database; parsing the data set to determine that at least a portion of the data set matches criteria indicative of potentially sensitive data; transmitting data to visually indicate the portion of the data set to a first user; applying a sensitivity marker received from the first user to at least the portion of the data set or receiving a confirmation of the sensitivity marker's application to at least the portion of the data set; and based at least on an access authorization of a second user and the sensitivity marker, granting the second user access to the data set in the second database.

The computer system can include one, all, or any combination of the following features. The operations further include: receiving, from the first user, an authorization to release one or more portions of the data set from the quarantine database; moving the data set to a second database where copying, moving, or sharing of the data set are permitted; receiving, from the second user, instructions for applying an ontology to the data set; wherein the second user is granted access to the data set that is in the second database; wherein the second user is not authorized to access the data set in the quarantine database; and wherein copying, moving, and share of the data set are prohibited for the data set while the data set is in the quarantine database until the data set is released from the quarantine database. The first user is not authorized to use or share the data set that is in the second database; and the second user is not authorized to view, copy, move, share, or release the data set in the quarantine database. The data set is received from a data provider; and wherein the data provider is not authorized to release the data set from the quarantine database. The data provider is not authorized to write data sets to the second database. The operations further include: receiving a regular expression or a selection of the regular expression; and wherein the regular expression is used as the criteria indicative of potentially sensitive data. The operations further include: determining, based on matching the regular expression to the portion of the data set, an indication of a type of sensitive information; and transmitting data to visually indicate that the portion of the data set is the type of sensitive information. The data set is received from a data provider; and the regular expression is provided or selected by the data provider. The operations further include: transmitting data to display, to the second user, a list of a plurality of data sets in the second database; wherein the list of the plurality of data sets includes the data set; and wherein the list of the plurality of data sets is filtered to exclude any data sets associated with markers that the second user is not authorized to view. The operations further include: performing a statistical analysis on the portion of the data set; and transmitting data to display, to the first user, results of the statistical analysis about the portion of the data set, wherein the statistical analysis is indicative of a uniqueness of the portion of the data set. The statistical analysis includes at least one of: a graph indicating a distribution of values; a histogram; a report about a number of unique entries; or a report about a number of repeated entries.

Some aspects feature a computer-implemented method of securing data for ontological classification, the method comprising: receiving a data set; storing the data set in a quarantine database where copying, moving, and sharing of the data set are restricted until released; parsing the data set to determine a portion of the data set that matches criteria indicative of potentially sensitive data; transmitting data to visually indicate the portion of the data set to a first user; receiving, from the first user, a sensitivity marker applied to at least the portion of the data set or confirmation of the sensitivity marker; receiving, from the first user, an authorization to release one or more portions of the data set from the quarantine database; moving the one or more portions of the data set to a second database where copying, moving, or sharing of the data set are permitted; based at least on an access authorization of a second user and the sensitivity marker, granting the second user access to the data set in the second database, wherein the second user is not authorized to access the data set in the quarantine database; and receiving, from the second user, instructions for applying an ontology to the data set.

The computer-implemented method can include one, some, or any combination of the following features. The first user is not authorized to use or share the data set that is the second database; and the second user is not authorized to view, copy, move, share, or release the data set in the quarantine database. The data set is received from a data provider; and wherein the data provider is not authorized to release the data set from the quarantine database. The data provider is not authorized to write data sets to the second database. Receiving a regular expression or a selection of the regular expression; and wherein the regular expression is used as the criteria indicative of potentially sensitive data. Determining, based on matching the regular expression to the portion of the data set, an indication of a type of sensitive information; and transmitting data to visually indicate that the portion of the data set is the type of sensitive information. The data set is received from a data provider; and the regular expression is provided or selected by the data provider. Transmitting data to display, to the second user, a list of a plurality of data sets in the second database; wherein the list of the plurality of data sets includes the data set; and wherein the list of the plurality of data sets is filtered to exclude any data sets associated with markers that the second user is not authorized to view. Performing a statistical analysis on the portion of the data set; and transmitting data to display, to the first user, results of the statistical analysis about the portion of the data set, wherein the statistical analysis is indicative of a uniqueness of the portion of the data set. The statistical analysis includes at least one of: a graph indicating a distribution of values; a histogram; a report about a number of unique entries; or a report about a number of repeated entries.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, like as charts and graphs, where appropriate, to allow the user to comfortably review the large amount of data and to take advantage of humans' particularly strong pattern recognition abilities related to visual stimuli.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
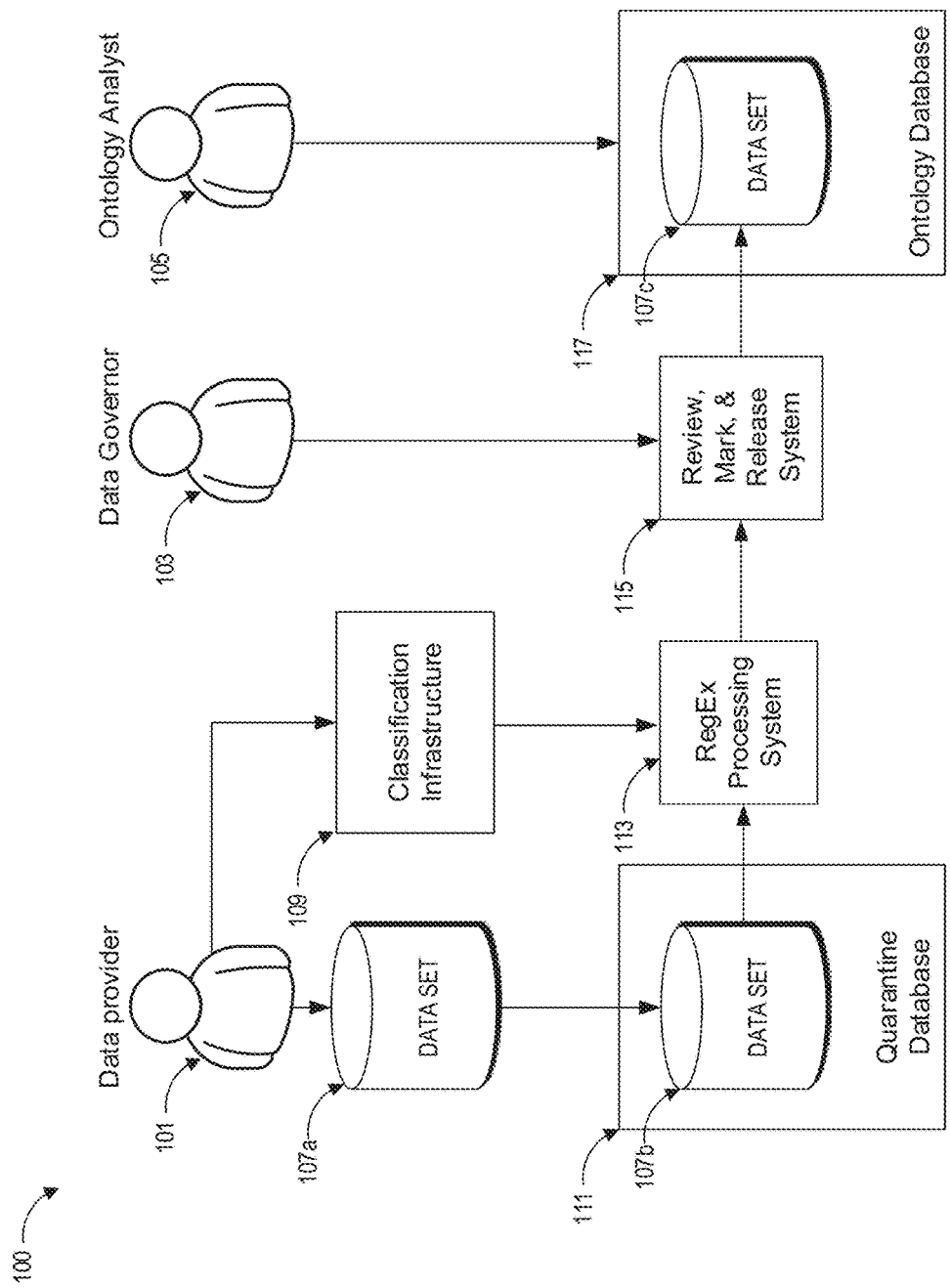
FIG. 1 illustrates an example diagram of a system for securely transferring, marking, and releasing a data set for ontological analysis and implementation.

FIG. 1 illustrates an example diagram of a system 100 for securely transferring, marking, and releasing a data set for access, review, analysis by authorized users or groups of user, such as, for example, for ontological analysis and implementation. The system includes a data provider 101, a data governor 103, an ontology analyst 105, a data set 107a, classification infrastructure 109, a copy of the data set 107b in a quarantine database 111, a regular expression ("RegEx") processing system 113, a reviewing, marking, and releasing system 115, and a released copy of the data set 107c (or at least a portion of the data set 107b) in an ontology database 117. The data provider 101, data governor 103, and ontology analyst 105 can be different people, parties, or entities. Different authorizations for the data provider 101, data governor 103, and ontology analyst 105 can be implemented through an access control list ("ACL") or other similar authorization control system.

A data provider 101 may have a data set 107a for delivery to third parties such as the ontology analyst 105 or other type of analyst, user, data processing person, system, organization, etc. to process very large volumes of data. The data provider 101 may routinely provide data sets 107a from the data provider's system to the third parties for the third parties to process, analyze, use, share, disseminate, etc. in part or in whole. Sometimes, the provided data sets 107a might include sensitive information, such as PII of an individual. The data provider 101 may be concerned about the security and privacy of any sensitive parts of the data set 107a after the data set is provided to the third parties. More specifically, the data provider 101 may be concerned that the third party (such as the ontology analyst 105) may inadvertently, perhaps out of error, routine, or oversight, cause sensitive data included in the data set 107a to be processed, analyzed, used, shared, disseminated, etc. inconsistently with privacy rules and policies. For example, even if security tools or procedures are available to the data provider 101, the data provider 101 may be concerned that security tools or procedures are not used or not used correctly before a data set is shared, used, or otherwise disseminated.

When the data set 107a is transferred by the data provider 101, a copy of the data set 107b is first stored in a quarantine database 111. In some implementations, a structured query language ("SQL") deny statement can be used to prevent data source creation outside of the quarantine database 111. The quarantine database 111 can be restricted in several ways such that access to data sets is restricted to certain users, such as those designated to review the data for sensitivity markers and edit the sensitivity markers. Data sets in the quarantine database 111 can be restricted from being viewed, edited, moved, or modified by parties (such as the ontology analyst 105) without sufficient authorizations. Writing new data sets to the quarantine database 111 can be limited to one or more data providers 101. Limited parties such as the data governor 103 and optionally the data provider 101 can analyze, review, or mark data sets 107b in the quarantine database. Transferring, sharing, or exporting of the data set 107b to locations outside of the quarantine database 111 can be restricted until the data set 107b, or portions of the data set 107b, are properly released by a data governor 103. After the data governor 103 releases the data set 107b, the data set 107b may be moved, transferred, or exported to locations outside of the quarantine database 111, such as to database 117.

In some embodiments, the data set 107b in the quarantine database 111 is treated as a new project, similar to a folder or other file container. Data within the project can inherit security markings of the project. The data set 107b may include separate files, columns, rows, raw data, sub-folders, sub-containers, etc.

In various embodiments, the different databases 111 and 117 can be implemented using a software database structure. For example, the copy of the data set 107b can include a special property indicating that the copy of the data set 107b is in the quarantine database 111 such that users other than the data providers and data governors are blocked from accessing the copy of the data set 107b. In some embodiments, the different databases 111 and 117 can be implemented in hardware, such as by storing data sets in different partitions, in different data stores, in different servers, etc. that have different authorizations. In some embodiments, a hybrid software and hardware implementation can be used to create the different databases 111 and 117.

A data provider 101 may have sufficient authorizations to write a data set 107b into the quarantine database 111. In some embodiments, after writing the data set 107b into the quarantine database 111, the data provider 101 is subsequently restricted from accessing the data set 107b. In some embodiments, after writing the data set 107b into the quarantine database 111, the data provider 101 is subsequently restricted from accessing the data set 107b unless the data provider 101 is granted authorization or clearance from a data governor 103. In some embodiments, after writing the data set 107b into the quarantine database 111, the data provider 101 has authorizations for the quarantine database 111 that are limited to data sets written by the data provider 101. When authorized, the data provider 101 can also view, view summaries or metadata about, or modify the data set 107b that the data provider 101 wrote into the quarantine database while the data set 107b remains in the quarantine database 111. In some embodiments, the data provider 101 can move the data set 107b written by the data provider 101 within the quarantine database 111. In some embodiments, the data provider can mark the data set 107b or portions of the data set 107b with markers to indicate sensitive data.

A data governor 103 may have a different set of authorizations with respect to the quarantine database. The data governor 103 can have authorizations to view data sets 107b in the quarantine database 111 regardless of who provided the data sets 107b. The data governor 103 can also have authorizations to view summaries or metadata about the data sets 107b in the quarantine database 111. The data governor 103 can also have authorizations to review markers (such as for sensitive data) and mark the data set 107b or portions of the data set 107b. The data governor 103 can also have authorization to release the data set 107b from the quarantine database 111 to other database, such as the ontology database 117. In some embodiments, a data governor 103 may receive a notification or request for release of a data set 107b. Other users such as the data provider 101 or analyst 105 can cause the notification or request to be sent to the data governor 103. In some embodiments, a notification or request for review of a data set 107b can be automatically generated and sent to the data governor 103 in response to processing the data set for a regular expression, such as by RegEx system 113.

If the data set 107b is associated with automatically generated markers (such as markers generated in response to matching RegEx patterns to mark potentially sensitive data), then the data governor's authorization to release the data set 107b can be withheld until all markers have been reviewed, and the authorization to move the data set 107b can be granted in response to at least reviewing and confirming or denying all of the automatically generated markers. In some embodiments, to prevent the data governor from developing a routine or habit of releasing the data set 107b to process as part of a workflow, the data governor 103 may not be authorized to perform subsequent processing or execute certain processes or programs on the data set 107c after the data set 107c is copied to the ontology database 117. Also, the data governor 103 can be restricted from using certain processing programs or sharing programs on the data set. For example, the data governor 103 may be limited to using approved reviewing, marking, searching, RegEx parsing, and editing programs on the data set 107b. The data governor 103 may be prevented from using an ontology generator, programs that share or transmit data, programs that copy or move data, programs that process data for use with other programs, or other programs on the data set 107b.

A classification infrastructure 109 can provide an interface and/or framework for users to generate and implement RegEx patterns. The classification infrastructure 109 may include editable templates that provide editable RegEx patterns, types of RegEx patterns, associated markers, and/or associated degrees of sensitivity. For example, the classification infrastructure 109 can receive, from the users (such as the data provider 101), RegEx patterns for emails, phone numbers, addresses, and other types of sensitive data. Each RegEx pattern can be associated with one or more markers indicating the type of associated information. Examples of types of associated information may include types of information such as personally identifiable information, confidential information, financial information, personal identification numbers, emails, phone numbers, names, and the like. Markers can also indicate a degree of sensitivity, such as very sensitive, less sensitive, highly confidential, less confidential, etc. As additional examples, a geographical address or an IP address matching a RegEx pattern may be marked as 50% personally identifiable information because such information does not necessarily uniquely identify a person, whereas a name may be marked as 99% personally identifiable information if 1% of people have duplicate names.

Besides using the templates, the classification infrastructure 109 can additionally or alternatively allow users to provide code or computer executable instructions for searching for sensitive data. In various embodiments, the RegEx patterns (and/or other rules, criteria, filters, etc.) can be provided by any user or combinations of users, including the data provider 101, data governor 103, analyst 105, and other users. In some embodiments, definitions of sensitive data can be provided, confirmed, or reviewed by a party that is not the data governor 103 or analyst 105 such that the data governor 103 and analyst 105 are not responsible for defining what is sensitive to different data providers.

The classification infrastructure 109 can include a data structure organizing types of RegEx patterns by type and provider. For example, a general type of RegEx patterns may be used to identify general types of personally identifiable information. A second type of RegEx patterns may be used to identify general types of financial information. A third type of RegEx patterns may be used to identify general types of confidential information. Some RegEx patterns may be provided from a specific data provider. For example, the data provider 101 may sometimes provide data sets including personal identification numbers in the 10 digit format #####-#####. A different data provider may sometimes provide different data sets that include personal identification numbers in a different format of [A-Z] [A-Z] [A-Z] [A-Z].####. A match with a respective RegEx pattern can cause a respective indication of a type of sensitive information (e.g., personally identifiable information, financial information, confidential information) to be automatically applied to the matching portion. By using the classification infrastructure 109, different data providers can provide customized definitions of what is sensitive data, and the different data providers can use the templates and types of prepopulated RegEx patterns to quickly do so.

In some embodiments, the classification infrastructure 109 can include an artificial intelligence ("AI") learning system, such as the Stanford machine learning library, to use machine learning to automatically detect and mark types of sensitive information. A user, such as the data provider 101 or the data governor 103, can review the automatically generated markers and confirm, add, or reject the markers of sensitive information. The feedback from the user can then be provided as feedback or input to the machine learning system to improve recognition sensitive information.

The data governor 103 can review data sets 107b for sensitive data. However, human review is prone to human error. Sensitive data can be erroneously overlooked, especially when data sets are very large. For example, some data sets may include hundreds, thousands, tens or hundreds of thousands of columns or rows of information or more. If a data set of text includes thousands of columns, a reviewer may overlook email addresses included in long paragraphs in columns 18,334 and 89,323 of an example 99,999 column data set. When reviewing large data sets for sensitive information, the chance of erroneously overlooking data increases as the size of the data set increases.

In some embodiments, the RegEx processing System 113 is configured to analyze the data set 107b for RegEx matches. Parts of the data set 107b that match a RegEx pattern are marked and visually flagged for review. The data governor 103 can remain unable to release the data set 107b from the quarantine database 111 until at least the portions of the data set 107b marked by the RegEx processing system 113 have been reviewed and confirmed or rejected.

The RegEx processing system 113 can be configured to automatically parse a data set 107b for RegEx patterns provided by or selected by the data provider 101. This allows the custom patterns of each data provider 101 to be detected. Additionally, one or more other general types of RegEx patterns can also be automatically used or selected to be used. In some embodiments, markers are applied at the data set level such that markers associated with RegEx matches for any portion of the data set 107b are applied to the data set 107b. In some embodiments, markers can additionally or alternatively be applied to specific portions of the data set 107b that match RegEx patterns, and the data set 107b can also be associated with all markers attached to portions within the data set 107b. The portions of the data set can be limited to specific matching characters and/or expanded for context (e.g., expanded to include a larger cell, group, column, row, or paragraph)

The RegEx processing system can also generate reports on the sensitivity of the data set 107b. The report can be based on, for example, a quantity or percentage of data within a data set 107b that is marked as sensitive. The report can also be based on, for example, the types of information matched by RegEx patterns. For example, a data set with portions matching a social security number RegEx of ###-##-#### may be reported as more sensitive than a data set with portions matching a phone number RegEx of (###) ###-####.

The data governor 103 can review the data set 107b for sensitive data. The types of sensitive data at issue may be provided by the data provider, by organizational standards, by regulations, etc. The data governor 103 can perform an unassisted review of the data set 107b. The data governor 103 can also be required to individually review at least each portion of the data set 107b matching one or more selected, provided, or automatically used RegEx patterns. After the review of at least each portion of the data set 107b matching the one or more selected, provided, or automatically used RegEx patterns, the data governor 103 may be granted authorization to move the data set 107b out of the quarantine database 111 to another database such as the ontology database 117.

During the review process, the data governor 103 can mark portions of the data set 107b. The markers can indicate certain types of sensitive data. The data governor 103 can add, change, and delete markers. The data governor 103 can declassify sensitive data by removing sensitivity markers. Once the data governor 103 finishes reviewing and marking the data set 107b and gains authorization to release the copy of the data set 107b, the data governor 103 can release and move the copy of the data set 107b to a non-quarantine database such as the ontology database 117. Sometimes, the data governor 103 can release a version 107c of the data set 107b that is marked, masked, redacted, deleted, and/or encrypted. A masked copy may be edited such that personally identifiable information (that was in data set 107b) is modified or partially hidden (in data set 107c). For example, certain digits of a phone number can be changed using a hash or algorithm. A redacted copy may delete or hide phone numbers from a data set and optionally indicate that the phone numbers are redacted. Masking or redacting a portion of data can cause a marker associated with the portion of data to be removed. An encrypted copy of the data may have the data modified according to an encryption algorithm such to allow individuals with a decryption key to decrypt the data. The data governor 103 can also delete sensitive information.

As an addition to allowing the data governor 103 to review the data set 107b for markers, in some embodiments, the data provider 101 can also review the data set 107b that the data provider 101 provided to the quarantine database 111. The data provider 101 can review the RegEx markers and/or add other sensitivity markers. Once the data provider 101 has completed an initial review of sensitivity markers and/or added other sensitivity markers, the data provider 101 can cause a notification to be sent to the data governor 103 to review and confirm that the data provider 101 properly reviewed at least the portions of the data set marked by the RegEx processing system 113 before releasing the data set 107b out of the quarantine database. Accordingly, in some embodiments, the data set 107b is reviewed by the data provider before being reviewed again by the data governor 103.

In some cases, the data governor 103 may create a new data set that does not include sensitive information for release. The new data set can be, for example, a redacted copy of the data set 107b. When doing so, the new data set can be created in the quarantine database 111. Before the new data set is released outside of the quarantine database, the new data set can be subject to similar procedures of RegEx analysis, marking, and review by a data governor 103 before release by the data governor 103.

The ontology database 117 can receive a copy of the data set 107c. If the copy of the data set is redacted or does not include sensitive data, then general users with access to the ontology database 117 can generally access the data set 117. If the copy of the data set 107c includes one or more markers indicating the presence of sensitive information, then only users with sufficient authorizations for each respective marker can access the data set 107c. For example, a user may be required to go through training for handling personally identifiable information ("PII") training before being authorized to access data sets marked with the "PII" marker.

In some embodiments, the ontology database 117 can allow the data governor 103 to move data sets 107b into the ontology database 117 as part of the releasing process, and the system 100 can subsequently restrict the data governor 103 from running certain programs on the released data set 107c. In some embodiments, the data governor 103 is not restricted from subsequently running the certain programs on the released data set 107c. The data governor 103 may be prevented from using an ontology generator, programs that share or transmit data, programs that copy or move data, programs that process data for use with other programs, or other programs on the data set 107c.

After the data set 107c is moved to the ontology database, the analyst 105 can access, use, move, modify, and share the data set 107c (e.g., in accordance with rights associated with the analyst 105 in an access control list). For example, the analyst 105 may be authorized to use the data set 107c with other programs, copy the data set 107c, etc. In some embodiments, the analyst 105 is an ontology analyst who applies an ontology to the data set as further described with respect to FIG. 7 and FIG. 8. In some embodiments, the analyst 105 is restricted from accessing the quarantine database 111. In some embodiments, the analyst 105 is allowed to see limited amounts of information, such as the names and file paths of data sets 109b and/or some limited metadata about the data sets 107b (such as when the data set 107b was added or who added the data set 107b) in the quarantine database and is able to generate requests to a data governor 103 to release the data set 107b, but the analyst 105 is otherwise restricted from the quarantine database 111.

Terms

In order to facilitate an understanding of the systems and methods discussed herein, a number of terms are described below. The terms described below, as well as other terms used herein, should be construed to include the provided description, the ordinary and customary meaning of the terms, and/or any other implied meaning for the respective terms. Thus, the descriptions below do not limit the meaning of these terms, but only provide exemplary descriptions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM), magnetic disks (e.g., hard disks, floppy disks), memory circuits (e.g., solid state drives, random-access memory (RAM)), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases), non-relational databases (e.g., NoSQL databases), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Quarantine Database: a database where copying, moving, and sharing of data sets in the quarantine database are restricted until the data set is released from the quarantine database.

Link: A connection between two data objects, based on, for example, a relationship, an event, and/or matching properties. Links may be directional, such as one representing a payment from person A to B, or bidirectional.

Example User Interfaces

Figure 2:
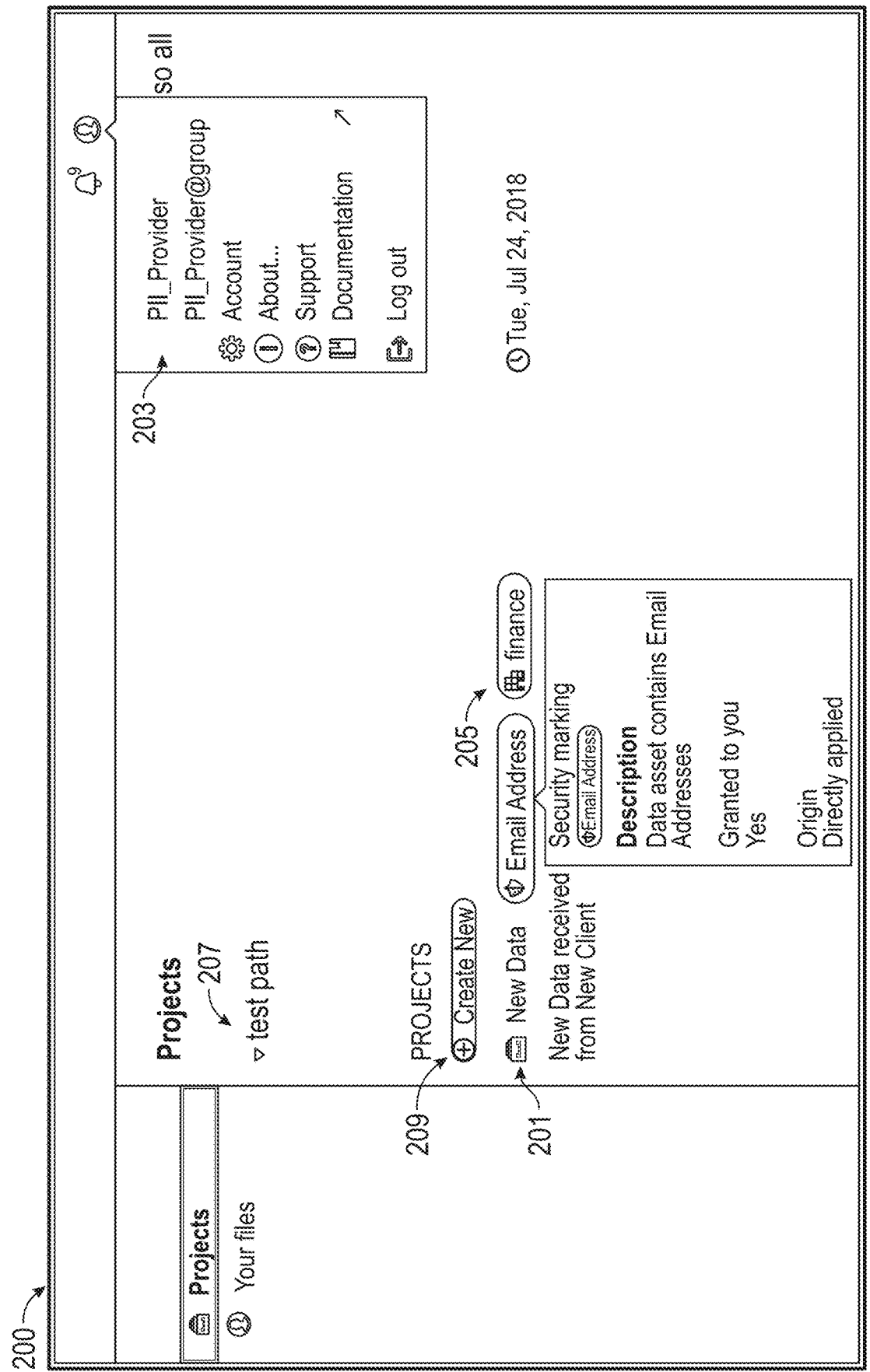
FIG. 2 illustrates an example user interface for a data provider or data governor to import data sets into and view data sets in a quarantine database.

FIG. 2 illustrates an example user interface 200 for a data provider to import data sets into and view data sets in a quarantine database. The user interface 200 lists a new data set 201 created by a user 203 in a quarantine database along with automatically generated markers 205 indicating types of sensitive data included within the data set 201. The user interface 200 also shows a selected path 207 and a button 209 for creating new data sets in the path 207.

The user 203 is logged in using username PII_Provider. The user 203 can be part of a group of users authorized to add new data sets (similar to the data provider 101 of FIG. 1). The user or data provider 203 can select a path 207 in which to create a new data set and ingest a new data set by selecting the button 209 to create a new data set. Regardless of the selected path, any newly created data set will be stored in a quarantine database (such as the quarantine database 111 of FIG. 1).

The user or data provider 203 can see data sets that the user or data provider 203 previously created. Other data sets in the quarantine database created by other users are not visible or accessible to the user or data provider 203. The example interface 200 shows that a data set 201 named "New Data" was previously added by the user or data provider 203 to the quarantine database. The New Data can be automatically parsed for RegEx patterns (such as by using the RegEx processing system 113 of FIG. 1) to determine markers 205 that are displayed next to the listed data sets. The example markers 205 indicate that the New Data may include email addresses and financial information. Data markers 205 can also include any markers added by a data governor.

Figure 3:
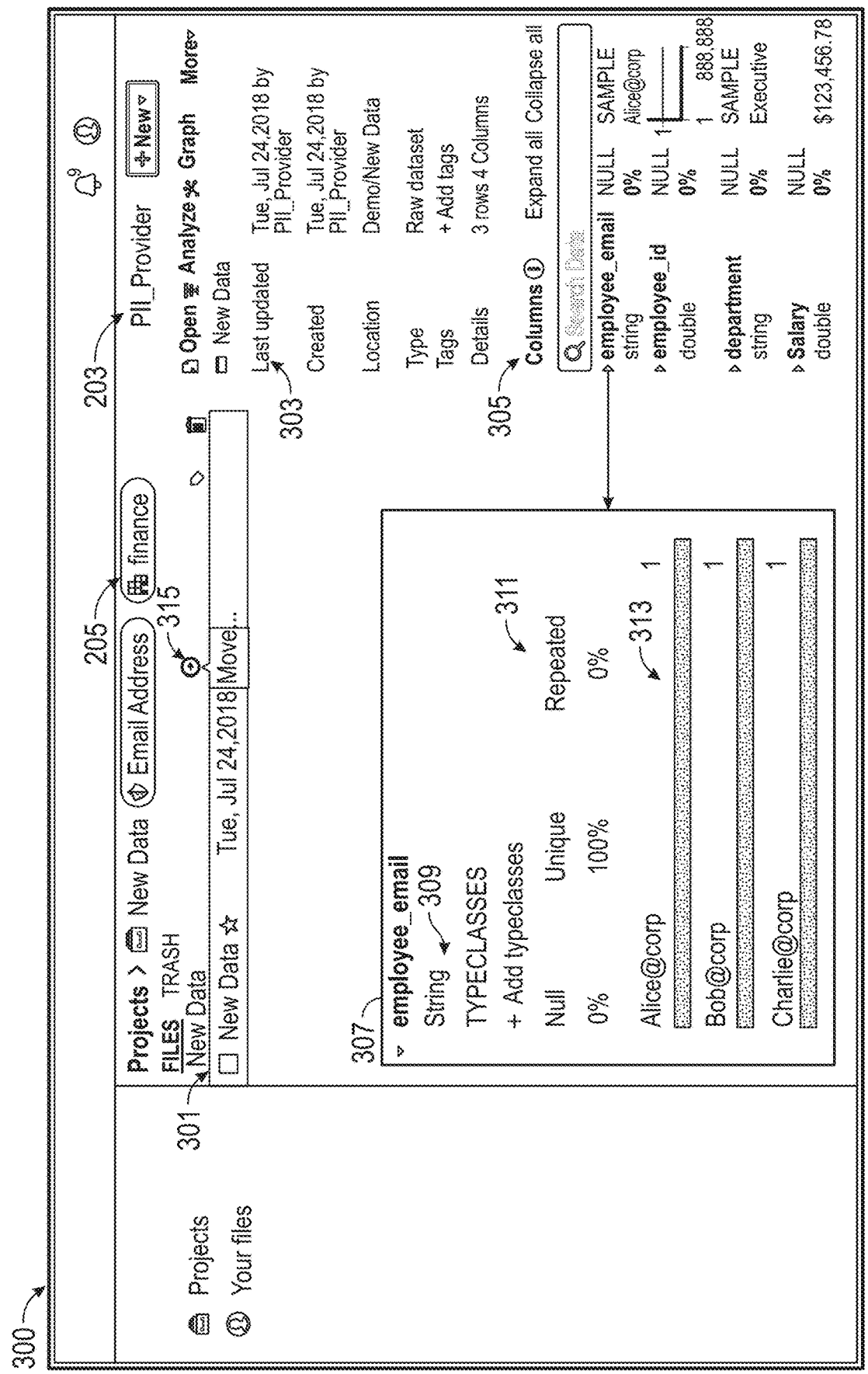
FIG. 3 illustrates an example user interface for a data provider or data governor to preview and manage data sets in a quarantine database.

FIG. 3 illustrates an example user interface 300 for the user or data provider 203 to preview and manage data sets in the quarantine database. The example user interface 300 shows the selected data set 301, metadata 303 about the selected data set 301 that includes an analysis and preview 305 of the data set 301. Parts of the analysis and preview 305 can be expanded to show additional details 307 including a type or class of data 309, statistical analysis about the data 311, and a preview of the data 313. The user interface 300 allows for a user to quickly perform a high level review for potentially sensitive data.

The metadata 303 can be displayed in response to a user selection of a data set 301. The user can be the user who provided the data or a data governor. The metadata can include information such as date and time of creation, what path the file is stored in, a type of data included in the data set, the size of the data set, and any markers or tags associated with the data set.

The metadata can also include analysis and preview 305 of the selected data set 301. For example, a preview displays four columns from the selected data set 301. For each column, a label (e.g., "email") and type or class (e.g., string, double, object types) is shown. Additionally, the data in each column can be automatically analyzed to display analysis results helpful for determining whether the data in each column may include sensitive information. For example, the number of null, repeated, unique entries in the column can be displayed. Higher levels of unique entries and lower levels of null or repeated entries suggest a higher likelihood of personally identifiable information. A preview of an entry from a column, such as a preview of the email "Alice@corp" can be displayed so that the type of data can be recognized even if a label of the column is unclear. For some types of numeric data, sample values can be displayed as a preview. For some types of data, a histogram or other chart or visualization can be displayed as statistical analysis. Although the example preview and analysis 305 is shown for each column of an example data set, other data formats (row based, key-pair based, etc.) can be automatically detected so that preview and analysis can be performed according to the other format.

A column of data from the analysis and preview 305 can be selected and expanded 307. The expanded analysis and preview 307 can show additional information, such as a type of the column, other type classes associated with the column, a more detailed listing of the number of null, unique, and repeated values 311, and/or more samples of data entries with frequencies of occurrences 313.

Figure 4:
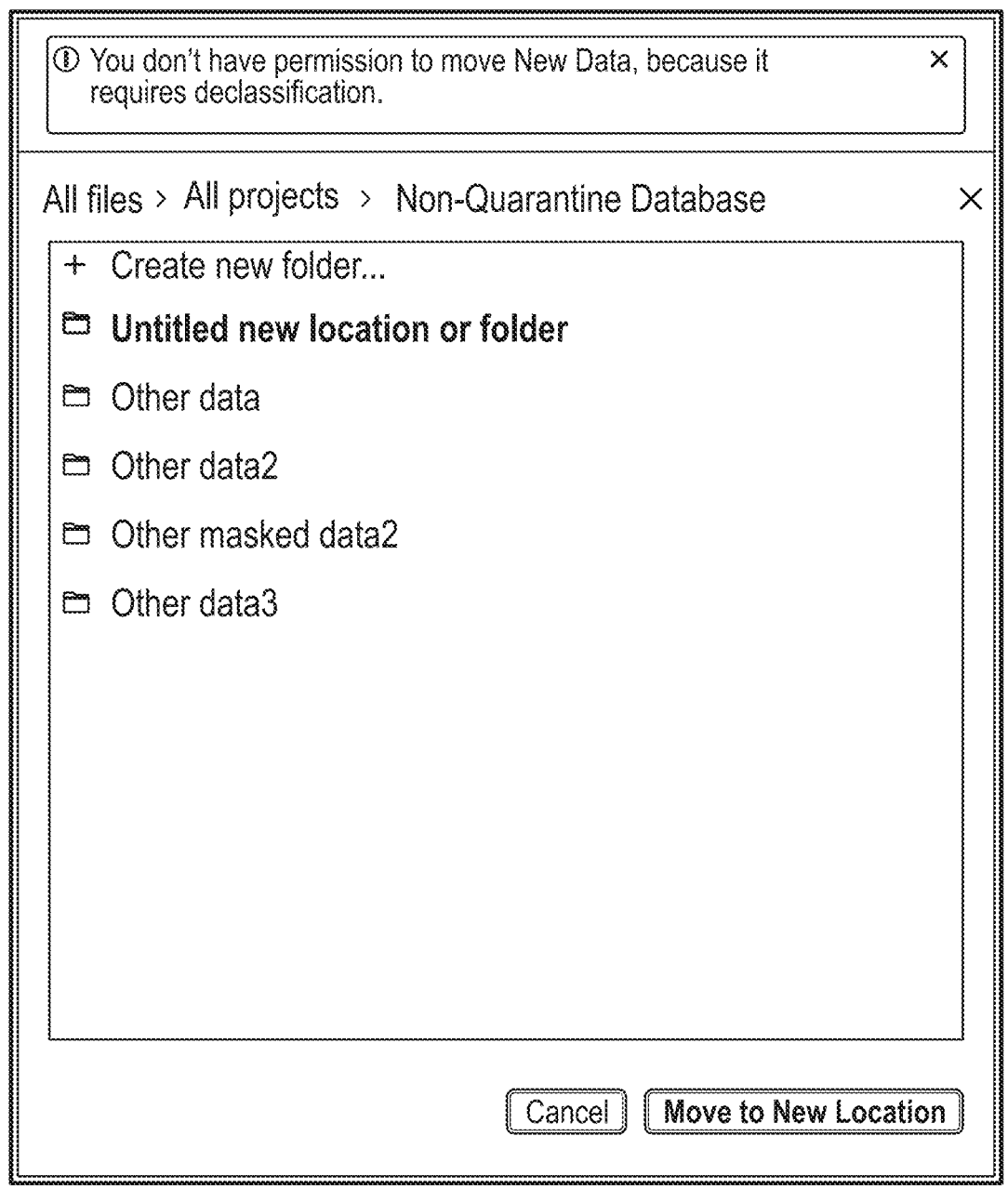
FIG. 4 illustrates an example user interface element restricting a data set in a quarantine database.

A user or data provider 203 may select an option 315 to move the selected data set 301. In response, a notification 400 such as shown in FIG. 4 can be displayed such that movement of the selected data set outside of the quarantine database is prevented. In some embodiments, the movement button 315 can be greyed out or omitted. Other options for moving a data set, whether through other menus, buttons, command line interfaces, API's, or other commands, can also be disabled, prevented, or omitted for the user or data provider 203. In some embodiments, the user or data provider 203 is permitted to move the data set to a different path within the quarantine database.

Figure 5:
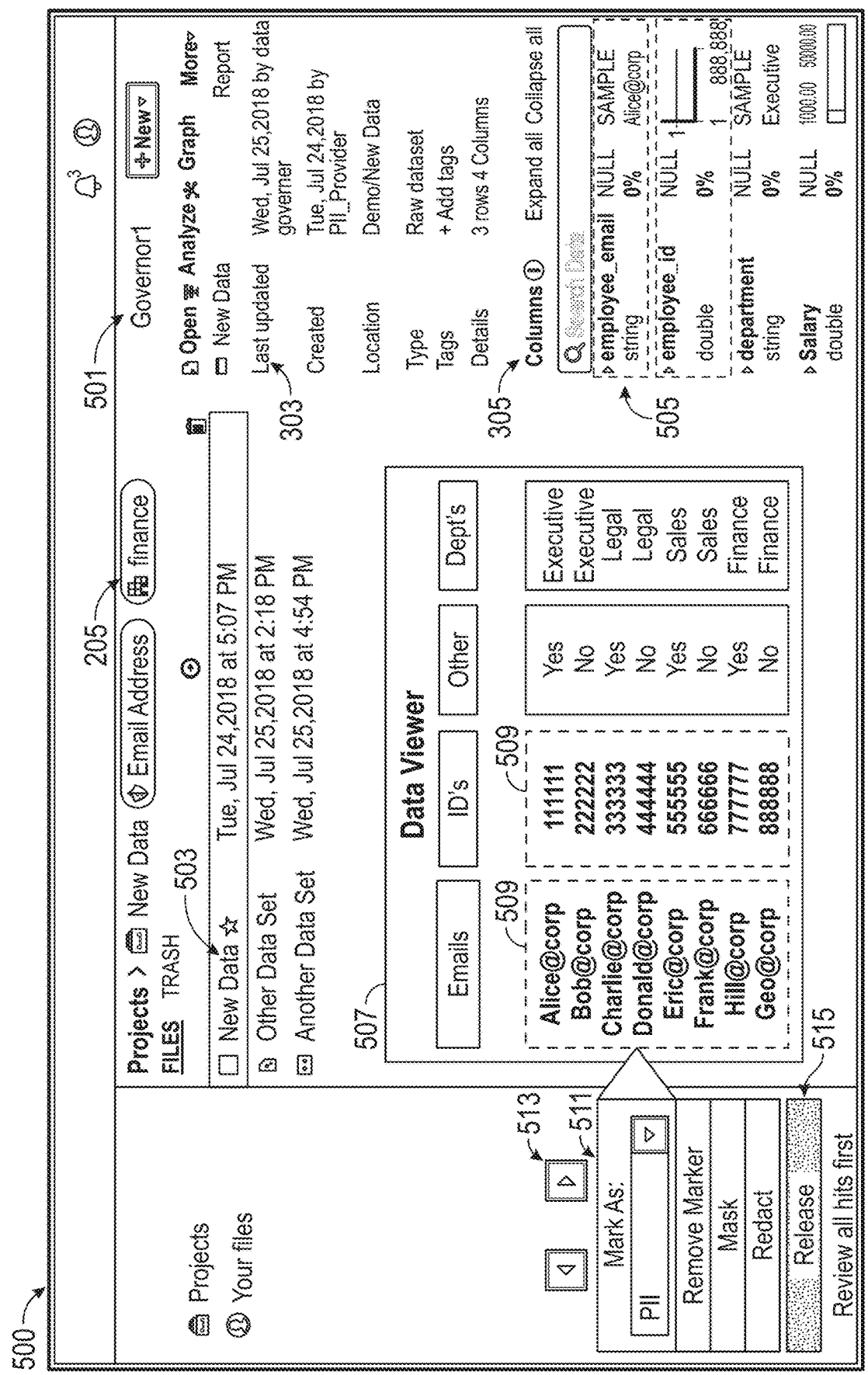
FIG. 5 illustrates an example user interface for a data governor to review and release a data set in a quarantine database.

FIG. 5 illustrates an example user interface 500 for a data governor to review and release a data set in a quarantine database. The example user interface 500 shows a list of data sets 503 in the quarantine database to a user 501 who is a data governor. In response to selecting the New Data, metadata 303 including the analysis and preview 305 of the New Data is shown with visually indicated portions 505, and data included in the New Data is shown in a data viewer 507. The shown data includes visual indications 509 of marked portions of the New Data, a menu 511 for processing a marked portion, navigation commands 513 to jump to the next marked portion, and an option 515 to release the selected data set.

In this example, the data governor is logged in with username Governor1 501 and has authorization to access, review, mark, and release data sets in the quarantined database. The user interface displays a list of data sets 503 included in the quarantine database, which may include data sets provided from a plurality of different data providers. In response to selecting the New Data set, the metadata 303 including the analysis and preview 305 are displayed, and the data included in the selected data set can also be displayed in a data viewer 507. In some embodiments, the data viewer 507 can be displayed in a separate window.

A parsing system can parse the data included in the New Data for RegEx matches and mark those portions. The marked portions 505 and 509, which may include automatically marked portions or manually marked portions, can be visually indicated, such as with highlighting, different colors, arrows, stylization, font sizing, etc. in a way that draws a human reviewer's attention. The data governor can use navigation options 513 to cause the data viewer 507 to jump through the displayed data set to display the next marked portion of data. In large data sets with hundreds, thousands, or greater numbers of data entries, jumping through the marked data can allow the data governor to quickly review the marked portions of data.

The data governor can select a marked portion of data to cause the menu 511 to be displayed. The menu 511 includes review options to provide or confirm the sensitivity marker and optionally provide a general label (such as PII) or specific label (such as email) indicating the reason for sensitivity. The menu 511 can automatically display a suggested tag based on the RegEx pattern that matched the portion of data. The menu 511 also includes an option to remove the marker for marked portions that do not include sensitive information. The menu 511 also includes options to mask the data or redact the data. In some embodiments, marking the data set or portions thereof can be performed in separate interfaces or with commands or scripts in various programming languages such as cURL, SQL, etc. or through application program interfaces ("API's").

After the data governor has reviewed at least the automatically marked portions to confirm or reject markers for RegEx matching portions, and preferably after the data governor has satisfactorily reviewed the entire data set, the release 515 option becomes enabled. The release option 515 enables the data governor to move the selected data set outside of the quarantine database. The data governor can select a button or provide a command to move the selected data set to a non-quarantine database without encountering the error message shown in FIG. 4 and without otherwise being prevented from moving the selected data set.

Figure 6:
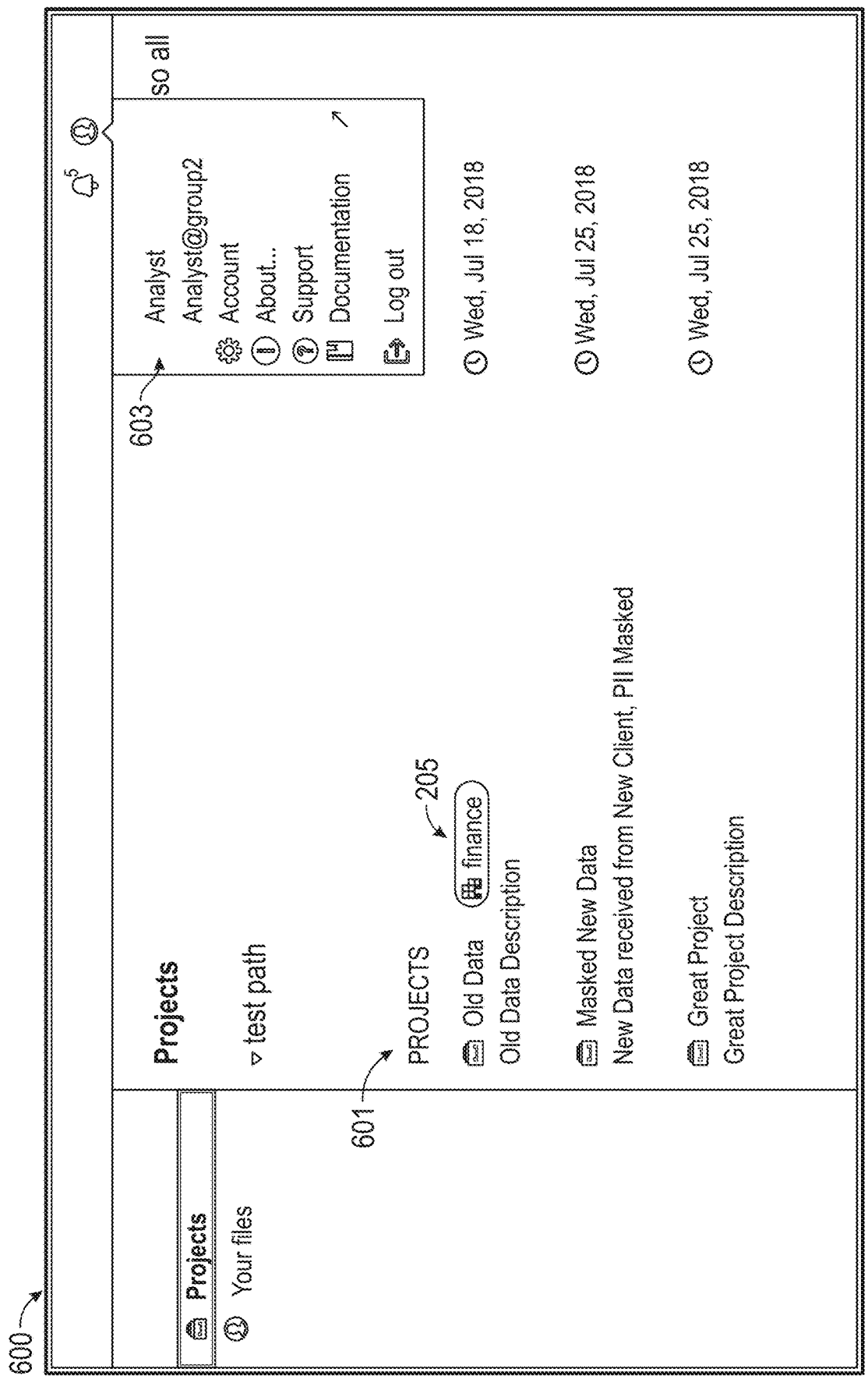
FIG. 6 illustrates an example user interface for an analyst to access data sets from a non-quarantine database.

FIG. 6 illustrates an example user interface 600 for an analyst to access data sets from a non-quarantine database. The user interface 600 shows a list 601 of data sets accessible by a user 603 in a non-quarantine database. Some of the listed data sets 601 may have markers 605.

The user interface 600 can show a username for the user 603 toward the top right corner. The user 603 can be, for example, an ontology analyst 105 described with respect to FIG. 1. The user 603 is not authorized to access, move, modify, or use data in the quarantine database. Instead, the user 603 can access, move, modify, and use data in the non-quarantine database.

The list 601 of data sets can include data sets that are in the non-quarantine database that the user 603 is authorized to access, move, modify, and use. The example list 601 includes data sets from a plurality of different data providers. Some of the listed data sets may have markers 605. The markers can be added automatically during RegEx pattern matching or added by a data governor. A user may have authorizations to see data sets with specific markers, and the user's authorizations for certain data sets can be restricted by certain markers if the user lacks the associated authorizations for those certain markers. The example user 603 is authorized to see data sets with the finance marker. However, the example user 603 may lack the authorization to see data sets with the "SSN" marker, and so data sets marked with "SSN" are omitted or hidden from the list 601 of data sets. In some embodiments, when a user lacks the required authorizations for a data set due to markers, the name of the data set can still be listed for display in the user interface along with the marker, but the user will not be authorized to open, copy, use, or modify the data set. This allows a user to know why the user is unable to access the data set.

In the illustrated example user interface 600, the Masked New Data set is listed 601 without any markers. This can result from a data governor selecting to mask or redact all sensitive portions of the New Data using the menu 511 shown in FIG. 5. Thus, the data governor can create a masked or redacted copy of the New Data to be moved to the non-quarantine database to be made available to the user 603. In other examples, the data governor can confirm the markers for sensitive portions of the New Data using the menu 511 shown in FIG. 5, and the user interface 600 can list New Data along with any markers 605 selected by the data governor. In some embodiments, the data governor who reviewed the New Data may be restricted from using the Masked New Data in further operations or with other programs, such as ontology operations or programs. The user 603 is permitted to use the Masked New Data in further operations and with other programs, such as ontology operations and programs further described with respect to FIG. 7 and FIG. 8.

Object-Centric Data Model

Figure 7:
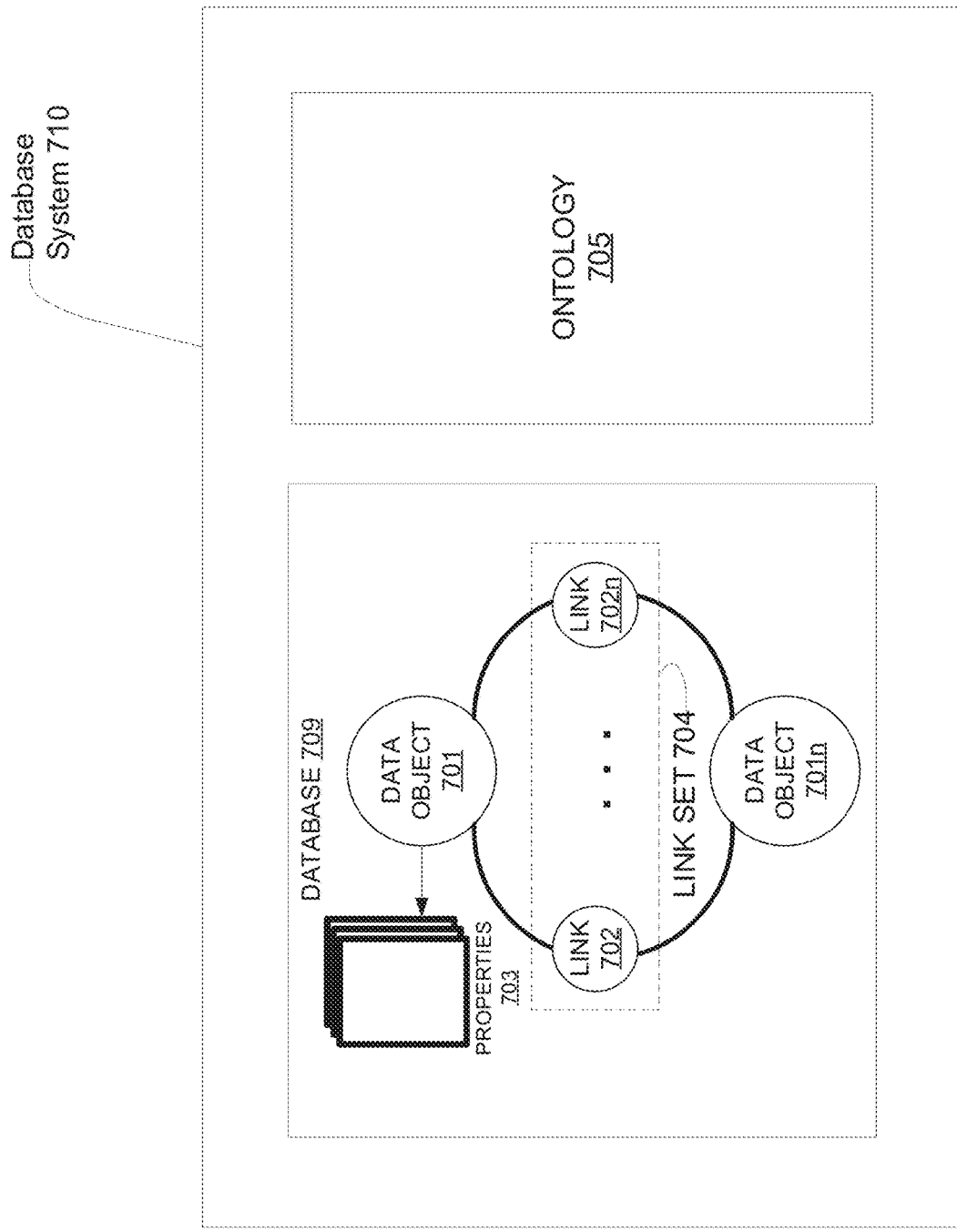
FIG. 7 illustrates one embodiment of a database system using an ontology.

FIG. 7 illustrates one embodiment of a database system 710 using an ontology. To provide a framework for the following discussion of specific systems and methods described herein, an example database system 710 using an ontology 705 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 705. The conceptual data model is independent of any particular database used for durably storing one or more database(s) 709 based on the ontology 705. For example, each object of the conceptual data model may correspond to one or more rows in a relational database or an entry in Lightweight Directory Access Protocol (LDAP) database, or any combination of one or more databases.

An ontology 705, as noted above, may include stored information providing a data model for storage of data in the database 709. The ontology 705 may be defined by one or more object types, which may each be associated with one or more property types. At the highest level of abstraction, data object 701 is a container for information representing things in the world. For example, data object 701 can represent an entity such as a person, a place, an organization, a market instrument, or other noun. Data object 701 can represent an event that happens at a point in time or for a duration. Data object 701 can represent a document or other unstructured data source such as an e-mail message, a news report, or a written paper or article. Each data object 701 is associated with a unique identifier that uniquely identifies the data object within the database system.

Different types of data objects may have different property types. For example, a "Person" data object might have an "Eye Color" property type and an "Event" data object might have a "Date" property type. Each property 703 as represented by data in the database system 710 may have a property type defined by the ontology 705 used by the database 705.

Objects may be instantiated in the database 709 in accordance with the corresponding object definition for the particular object in the ontology 705. For example, a specific monetary payment (e.g., an object of type "event") of US$30.00 (e.g., a property of type "currency") taking place on Mar. 27, 2009 (e.g., a property of type "date") may be stored in the database 709 as an event object with associated currency and date properties as defined within the ontology 705. The data objects defined in the ontology 705 may support property multiplicity. In particular, a data object 701 may be allowed to have more than one property 703 of the same property type. For example, a "Person" data object might have multiple "Address" properties or multiple "Name" properties.

Each link 702 represents a connection between two data objects 701. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 701 can have multiple links with another data object 701 to form a link set 704. For example, two "Person" data objects representing a husband and a wife could be linked through a "Spouse Of" relationship, a matching "Address" property, and one or more matching "Event" properties (e.g., a wedding). Each link 702 as represented by data in a database may have a link type defined by the database ontology used by the database.

Figure 8:
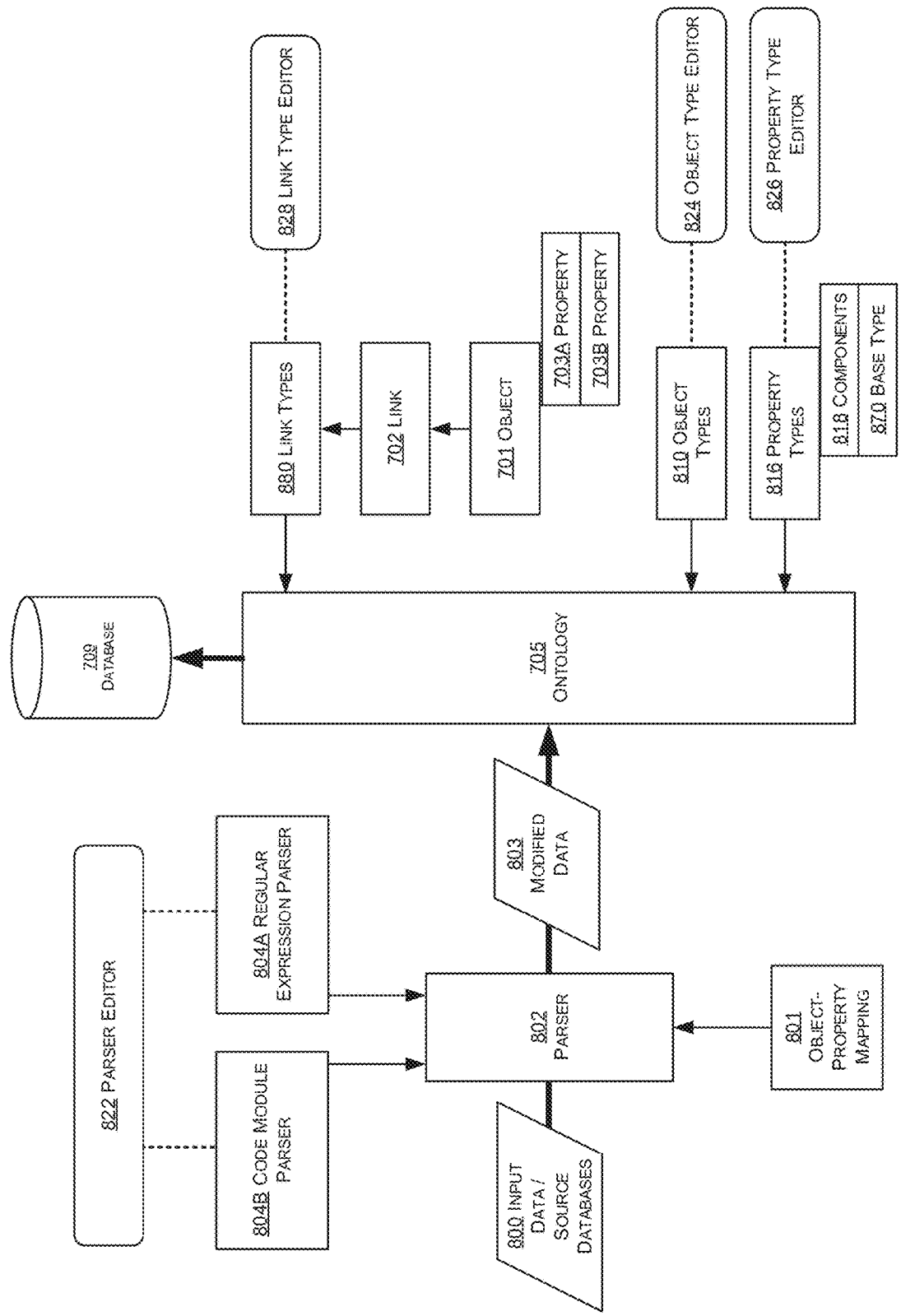
FIG. 8 is a block diagram illustrating example components and data that may be used in identifying and storing data according to an ontology.

FIG. 8 shows a block diagram illustrating exemplary components and data that may be used in identifying and storing data according to an ontology. In this example, the ontology may be configured, and data in the data model populated, by a system of parsers and ontology configuration tools. In the embodiment of FIG. 8, input data 800 is provided to parser 802. The input data may comprise data from one or more sources. For example, a rental car institution may have one or more databases with information on calendar entries, rental cars, and people. The databases may contain a variety of related information and attributes about each type of data, such as a "date" for a calendar entries, an address for a person, and a date for when a rental car is rented. The parser 802 is able to read a variety of source input data types and determine which type of data it is reading.

In accordance with the discussion above, the example ontology 705 comprises stored information providing the data model of data stored in database 709, and the ontology is defined by one or more object types 810, one or more property types 816, and one or more link types 830. Based on information determined by the parser 802 or other mapping of source input information to object type, one or more data objects 701 may be instantiated in the database 709 based on respective determined object types 810, and each of the objects 701 has one or more properties 703 that are instantiated based on property types 816. Two data objects 701 may be connected by one or more links 702 that may be instantiated based on link types 830. Each link 702 can have link type 880. The types 880 of links 702 can be edited by a link type editor 828. Using the link types 880 defined in the ontology, input data 800 may be parsed by the parser 802 or analyzed by a user to determine which link types 880 should be applied to link 702 different objects 701.

The property types 816 each may comprise one or more data types 818, such as a string, number, etc. Property types 816 may be instantiated based on a base property type 280. For example, a base property type 280 may be "Locations" and a property type 816 may be "Home."

In some embodiments, a user of the system uses an object type editor 824 to create and/or modify the object types 810 and define attributes of the object types. In some embodiments, a user of the system uses a property type editor 826 to create and/or modify the property types 816 and define attributes of the property types. In some embodiments, a user of the system uses link type editor 828 to create the link types 830. Alternatively, other programs, processes, or programmatic controls may be used to create link types and property types and define attributes, and using editors is not required.

In some embodiments, creating a property type 816 using the property type editor 826 involves defining at least one parser definition using a parser editor 822. A parser definition comprises metadata that informs parser 802 how to parse input data 800 to determine whether values in the input data can be assigned to the property type 816 that is associated with the parser definition. In an embodiment, each parser definition may comprise a regular expression parser 804A or a code module parser 804B. In other embodiments, other kinds of parser definitions may be provided using scripts or other programmatic elements. Once defined, both a regular expression parser 804A and a code module parser 804B can provide input to parser 802 to control parsing of input data 800.

Using the data types defined in the ontology, input data 800 may be parsed by the parser 802 determine which object type 810 should receive data from a record created from the input data, and which property types 816 should be assigned to data from individual field values in the input data. Based on the object-property mapping 801, the parser 802 selects one of the parser definitions that is associated with a property type in the input data. The parser parses an input data field using the selected parser definition, resulting in creating new or modified data 803. The new or modified data 803 is added to the database 709 according to ontology 705 by storing values of the new or modified data in a property of the specified property type. As a result, input data 800 having varying format or syntax can be created in database 709. The ontology 705 may be modified at any time using object type editor 824, property type editor 826, and link type editor 828, or under program control without human use of an editor. Parser editor 822 enables creating multiple parser definitions that can successfully parse input data 800 having varying format or syntax and determine which property types should be used to transform input data 800 into new or modified input data 803.

Example Flowchart

Figure 9:
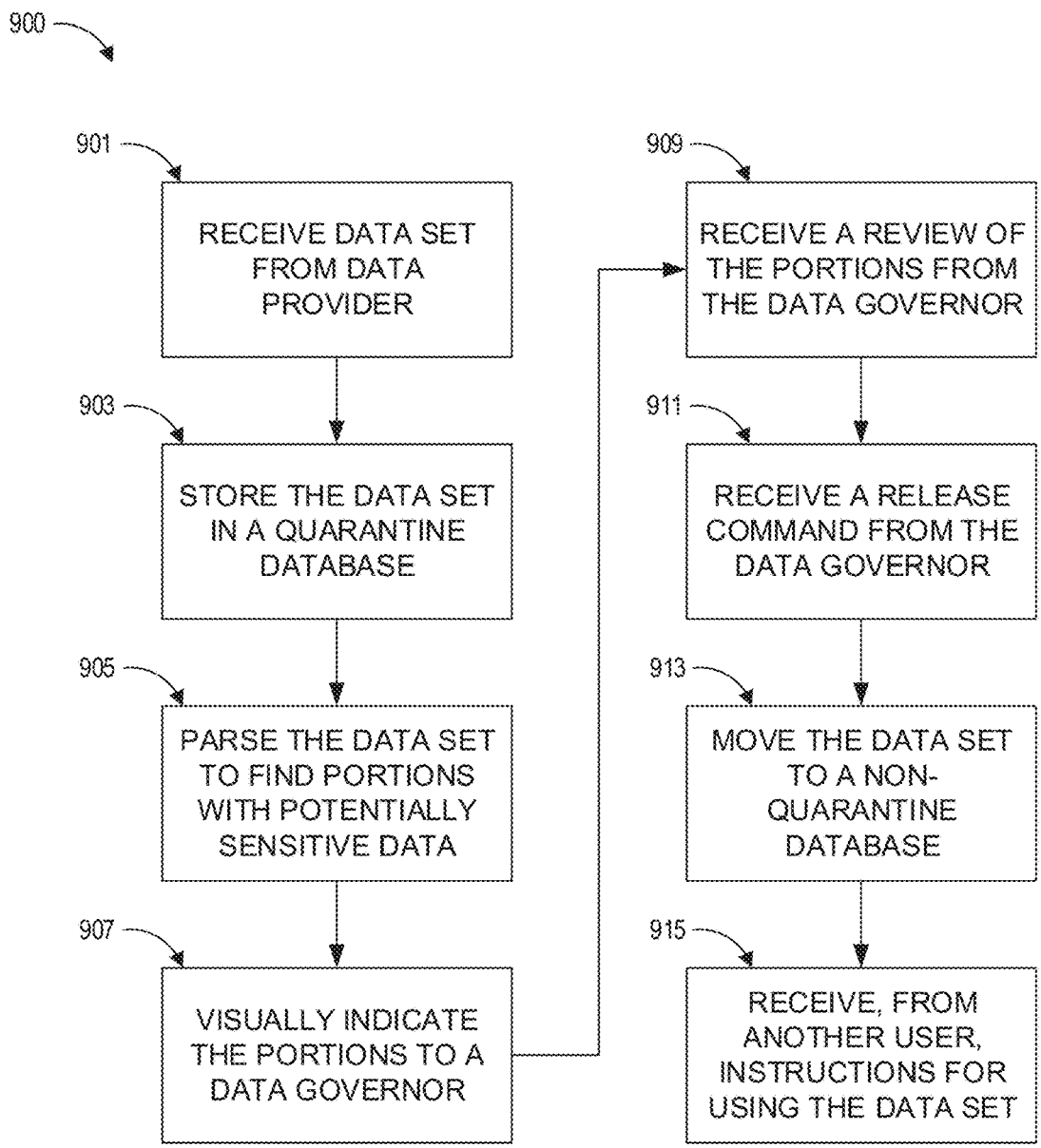
FIG. 9 is a block diagram illustrating an example flowchart for securely transferring, marking, and releasing a data set for ontological implementation.

FIG. 9 is a block diagram illustrating an example flowchart 900 for securely transferring, marking, and releasing a data set for ontological implementation. At block 901, a data set can be received from a data provider (such as the data provider 101 of FIG. 1).

At block 903, the data set can be stored in a quarantine database (such as the quarantine database 111 of FIG. 1). A computer system can automatically store the data set in the quarantine database without allowing the data set to be initially stored outside of the quarantine database. The quarantine database may impose different restrictions on different users, such as restrictions on the data providers, data governors, and analysts (such as described with respect to FIG. 1). In the quarantine database, copying, moving out, and sharing of the data set can be restricted until the data set is released by a data governor.

Data providers may be authorized to provide data sets to the quarantine database and optionally view, mark, or review markers for the data sets that the data provider provided to the quarantine database. Data providers may be restricted from releasing data sets from quarantined databases and/or writing to non-quarantine databases. Data governors may be authorized to mark and review markers for the data sets in the quarantine database and also authorized to release data sets from the quarantine database after at least marked portions of a data set have been reviewed. The data governors may be restricted from using data sets in the quarantine database except for marking, reviewing, and releasing data sets. Analysts may be unauthorized from accessing, viewing, copying, using, sharing, or releasing data sets in the quarantine database.

At block 905, the data set can be parsed to determine a portion of the data set that matches criteria indicative of potentially sensitive data. Parsing can include matching the portion of the data set to a RegEx pattern (such as described with respect to the RegEx processing system 113 of FIG. 1). If a match with a RegEx pattern is detected, then the matching portion of the data set can be marked. The marking can include or be associated with a type of sensitive data detected based on which RegEx pattern was matched. In some embodiments, the mark can be applied at the data set level.

Some RegEx patterns can be searched by default. Some RegEx patterns can be provided or edited through a template. Some RegEx patterns can be edited or custom written. Parsing can include searching using other techniques other than matching regular expressions, such as scoring certain words, using AI learning techniques, determining uniqueness of data, or using other indicators of potentially sensitive data.

At block 907, display data can be transmitted to the data governor to visually indicate the matching portion of the data set to a data governor. The visual indication can be displayed on a screen using different colors, stylization, font sizing, highlighting, or other indicator that draws attention. The data governor can review the marked portion of the data set. The visual indications can also include a type of potentially sensitive data that was matched based on the particular RegEx pattern that was matched. Visual indications can also include a statistical analysis of uniqueness of the portion of the data set, such as whether certain data is repeated, unique, etc.

At block 909, a data governor can review and confirm whether or not the sensitivity marker is correctly applied to the portion of the data set. Sometimes, a different or corrected sensitivity marker can be received from the data governor to be applied to the portion of the data set. After the data governor has reviewed at least any portions of the data set that match RegEx expressions, the system can authorize or enable the data governor to release the data set. Before the data governor has reviewed at least the matching portions of the data set, the data governor can be prevented from releasing the data set.

At block 911, a release command can be received from the data governor. The release command for a data set can be enabled or authorized after the data governor had finished marking and reviewing the data set or at least the automatically marked portions of the data set.

At block 913, in response to receiving the release command, data set can be moved to a second database where copying, moving, or sharing of the data set are permitted. The second database can be a non-quarantine database. In some embodiments, the data governor is restricted from using the data in the second database after the data set has been moved to the second database. The data provider may be restricted from accessing or using the second database or writing new data sets to the second database.

At block 915, a computer system can receive, a the second user, instructions for applying an ontology to the data set. The computer system can also receive, from the second users, other instructions, such as to share the data set, to use the data set with other programs, to move or edit the data set, etc.

The second user may view any data sets in the second database that do not have sensitivity markers. the second user can be authorized to access, view, and use data sets in the second database for which the second user has appropriate authorizations. For example, the second user can also be authorized to view any data sets in the second database with certain markers. As another example, the second user can have authorizations for data sets associated with some types of markers but not data sets associated with other types of markers. Some users may only be authorized to access data sets in the second database when the data sets do not have any sensitivity markers. Accordingly, data can be transmitted to the second user to list data sets based at least in part on the second user's authorizations and on markers associated with data sets within the second database, and the list can exclude any data sets with markers that the second user is not authorized to view are excluded from the list. The second user is not authorized to access the data set in the quarantine database.

Additional Analysis

The system 100 of FIG. 1 can also be used to generate other types of reports. The database 117 can include data sets 107c that have been marked with markers. The data sets can be analyzed to determine a quantity of data that is marked with markers, and the quantity can be logged and reported over time. For example, a report can indicate a percentage of data sets that are marked as sensitive (e.g., 40 of 100 data sets have at least one marker, 20 of 100 data sets have 2 or more markers) or what percentage of each data set is marked with markers (e.g., 35 of 2000 rows of data in a data set are marked). In addition, the types of sensitive information (e.g., PII, confidential information) and sensitivity (e.g., highly sensitive, low sensitivity, a numerical rating) of marked information in data sets of the database 117 can also be determined and included in the report. The report can also include comparisons over time to indicate how the sensitivity of data changes over time. For example, the report can include a chart or other visualization showing how the percentage of data sets with at least one sensitivity marker changes over the course of days, weeks, months, or years.

The reports can also show the sensitivity of a data set 107c as the data set 107c is processed and used by sequences of programs. For example, data set 107c may be used with a first program, then with a second program, and then with a third program. With each program, the data set 107c may be edited, and the report can provide statistics showing whether the quantity of sensitive data in the data set 107c increases or decreases. For example, a first program might be used to remove portions of a data set, the second program might be used to combine the data set with other data, and the third program might be used to share the joined data set. It can be useful to quickly determine if, for example, sensitive data is removed during editing by the first program, new sensitive data is added using the second program, and the sensitivity of the joined data that is shared with the third program. The reports can also show who edited or used data when and changes to the sensitivity of the data that occur in response to users editing the data.

The system can also search through a database 117 to find all data sets that have certain types of markings. When new types of data are determined to be sensitive, a new RegEx pattern indicative of the new type of data can be received, and the RegEx processing system 113 can search through the database 117 to find new data types that match the new RegEx pattern.

The system can also be used to generate reports aggregating sensitivity markers about selected data sets within a database 117. For example, a selected set of data sets within a database 117 can be analyzed to determine which markers are associated. This can be useful, for example, to determine what types of sensitive data are included in the selected set of data. This can allow users to quickly determine if a group of data sets can be shared with certain other users in compliance with privacy policies.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed via software instructions executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks. In combination, the computer readable program instructions causes the general purpose computer to perform special functions an become a special purpose computer.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such as application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
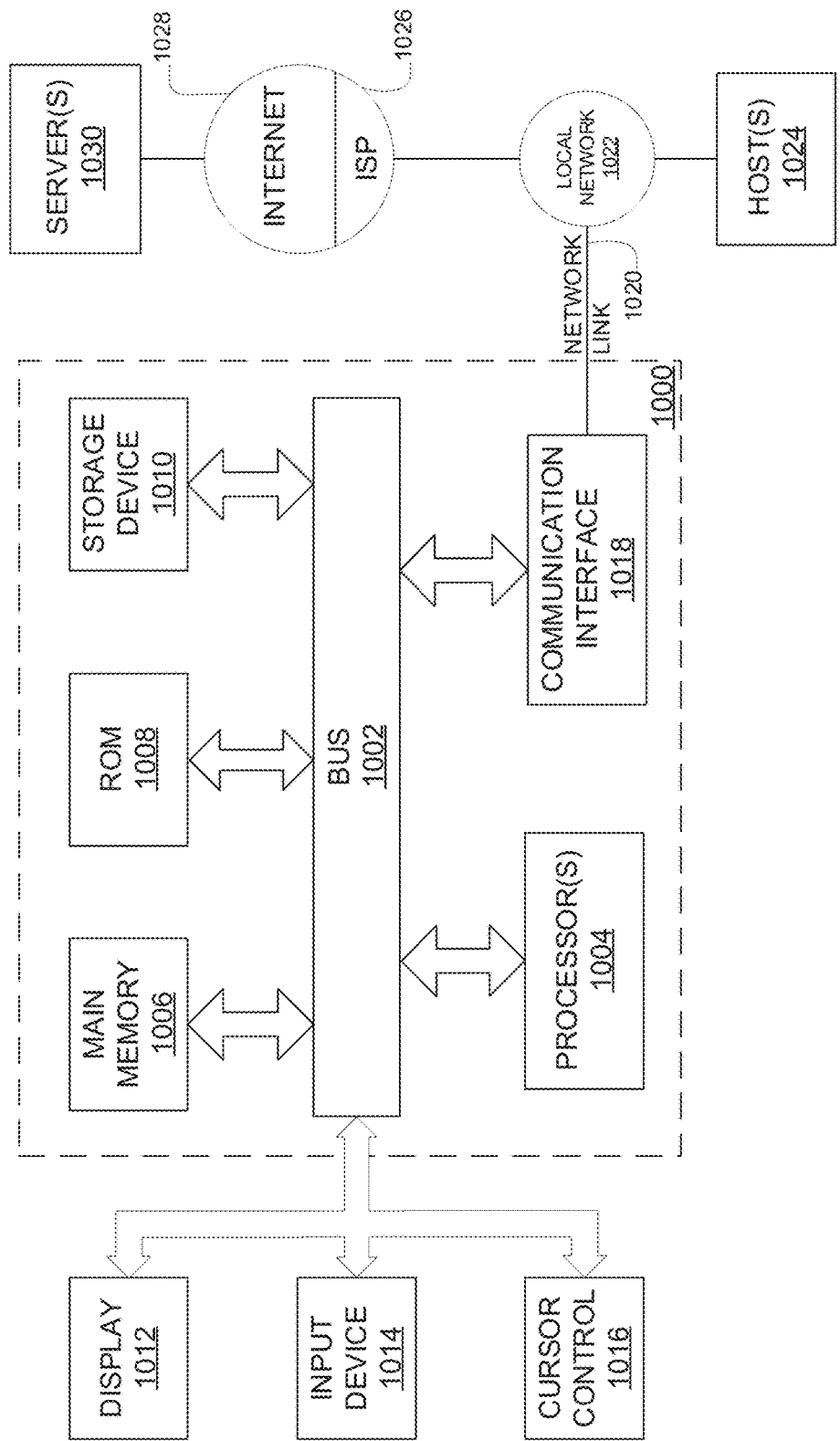
FIG. 10 illustrates a computer system with which certain methods discussed herein may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors that are implemented in a special combination with other components to serve a special purpose, thus being a special purpose microprocessor for a special purpose computer system.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
    storing a data set in a quarantine database;
    determining that at least a portion of the data set matches criteria indicative of potentially sensitive data;
    transmitting data to visually indicate, to a first user, the portion of the data set that matches the criteria indicative of potentially sensitive data;
    in response to an input from the first user, applying a sensitivity marker to at least the portion of the data set or confirming the sensitivity marker's application to at least the portion of the data set; and
    based at least on an access authorization of a second user and the sensitivity marker, granting the second user access to at least the portion of the data set.

2. The computer-implemented method of claim 1, further comprising:
    receiving, from the first user, an authorization to release one or more portions of the data set, including the portion of the data set to which the sensitivity marker has been applied, from the quarantine database;
    in response to receiving the authorization, moving the one or more portions of the data set to a second database where copying, moving, or sharing of the data set are permitted;
    receiving, from the second user, instructions for applying an ontology to the data set;
    wherein the second user is granted access to the data set that is in the second database;
    wherein the second user is not authorized to access the data set in the quarantine database; and
    wherein copying, moving, and share of the data set are prohibited for the data set while the data set is in the quarantine database until the data set is released from the quarantine database.

3. The computer-implemented method of claim 2, wherein:
    the first user is not authorized to use or share the data set that is in the second database; and
    the second user is not authorized to view, copy, move, share, or release the data set in the quarantine database.

4. The computer-implemented method of claim 3, wherein:
    the data set is received from a data provider; and
    the data provider is not authorized to release the data set from the quarantine database.

5. The computer-implemented method of claim 4, wherein:
    the data provider is not authorized to write data sets to the second database.

6. The computer-implemented method of claim 1, further comprising:
    receiving a regular expression or a selection of the regular expression;
    wherein the regular expression is used as the criteria indicative of potentially sensitive data.

7. The computer-implemented method of claim 6, further comprising:
    determining, based on matching the regular expression to the portion of the data set, an indication of a type of sensitive information; and
    transmitting data to visually indicate that the portion of the data set is the type of sensitive information.

8. The computer-implemented method of claim 7, wherein:
    the data set is received from a data provider; and
    the regular expression is provided or selected by the data provider.

9. The computer-implemented method of claim 2, further comprising:
    transmitting data to display, to the second user, a list of a plurality of data sets in the second database;
    wherein the list of the plurality of data sets includes the data set; and
    wherein the list of the plurality of data sets is filtered to exclude any data sets associated with markers that the second user is not authorized to view.

10. The computer-implemented method of claim 1, further comprising:
    performing a statistical analysis on the portion of the data set; and
    transmitting data to display, to the first user, results of the statistical analysis about the portion of the data set, wherein the statistical analysis is indicative of a uniqueness of the portion of the data set.

11. The computer-implemented method of claim 10, wherein the statistical analysis includes at least one of:
    a graph indicating a distribution of values;
    a histogram;
    a report about a number of unique entries; or
    a report about a number of repeated entries.

12. A computer system comprising:
    one or more non-transitory, computer readable storage devices configured to store computer-readable instructions; and
    one or more processors configured to execute the computer-readable instructions to cause the computer system to perform operations comprising:
        storing a data set in a quarantine database;
        parsing the data set to determine that at least a portion of the data set matches criteria indicative of potentially sensitive data;

transmitting data to visually indicate, to a first user, the portion of the data set that matches criteria indicative of potentially sensitive data;

in response to an input from the first user, applying a sensitivity marker to at least the portion of the data set or confirming the sensitivity marker's application to at least the portion of the data set; and based at least on an access authorization of a second user and the sensitivity marker, granting the second user access to at least the portion of the data set.

13. The computer system of claim 12, wherein the operations further include:

receiving, from the first user, an authorization to release one or more portions of the data set, including the portion of the data set to which the sensitivity marker has been applied, from the quarantine database;

in response to receiving the authorization, moving the data set to a second database where copying, moving, or sharing of the data set are permitted;

receiving, from the second user, instructions for applying an ontology to the data set;

wherein the second user is granted access to the data set that is in the second database;

wherein the second user is not authorized to access the data set in the quarantine database; and wherein copying, moving, and share of the data set are prohibited for the data set while the data set is in the quarantine database until the data set is released from the quarantine database.

14. The computer system of claim 12, wherein:

the first user is not authorized to use or share the data set that is in the second database; and the second user is not authorized to view, copy, move, share, or release the data set in the quarantine database.

15. The computer system of claim 12, wherein:

the data set is received from a data provider; and the data provider is not authorized to release the data set from the quarantine database.

16. The computer system of claim 12, wherein the operations further include:

receiving a regular expression or a selection of the regular expression;

wherein the regular expression is used as the criteria indicative of potentially sensitive data.

17. The computer system of claim 16, wherein the operations further include:

determining, based on matching the regular expression to the portion of the data set, an indication of a type of sensitive information; and transmitting data to visually indicate that the portion of the data set is the type of sensitive information.

18. The computer system of claim 17, wherein:

the data set is received from a data provider; and the regular expression is provided or selected by the data provider.

19. The computer system of claim 12, wherein the operations further include:

transmitting data to display, to the second user, a list of a plurality of data sets in the second database;

wherein the list of the plurality of data sets includes the data set; and wherein the list of the plurality of data sets is filtered to exclude any data sets associated with markers that the second user is not authorized to view.

20. The computer system of claim 12, wherein the operations further include:

performing a statistical analysis on the portion of the data set; and transmitting data to display, to the first user, results of the statistical analysis about the portion of the data set, wherein the statistical analysis is indicative of a uniqueness of the portion of the data set.

* * * * *